Patented Oct. 18, 1932　　　　　　　　　　　　　　　　1,883,735

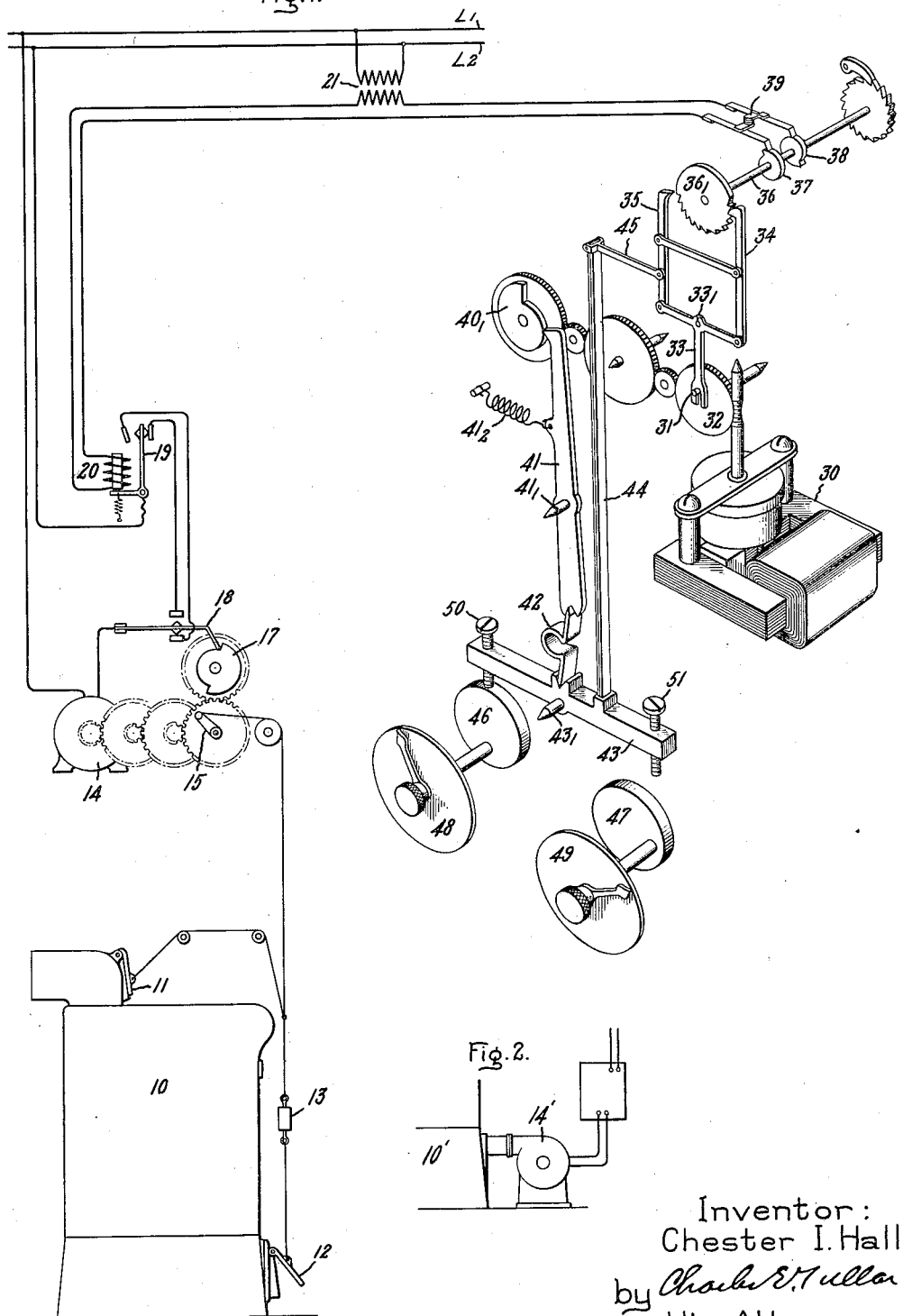

UNITED STATES PATENT OFFICE

CHESTER I. HALL, OF PHILADELPHIA, PENNSYLVANIA, ASSIGNOR TO GENERAL ELECTRIC COMPANY, A CORPORATION OF NEW YORK

MECHANICAL RELAY

Application filed November 30, 1929. Serial No. 410,844.

My invention relates to control devices, more particularly to relays, and has for its object a mechanical relay thermostatically controlled for regulating heat supplying apparatus, such as furnaces, radiators and the like.

Heretofore, the thermostat was called upon to not only indicate when heat was desired and when not desired, but it was necessary that a circuit be closed through the heat responsive element of the thermostat, thus making it necessary for the thermostat to carry the current directly which obviously is not conducive to the best operation of the thermostat since the accuracy of the thermostat could be affected thereby due to the currents flowing therethrough.

Furthermore, a thermostat being of such delicate construction can hardly be called upon to carry more than very small or feeble currents in order to prevent undesirable sparking at the contacts.

Again a sudden draft directed against the thermostat, or a temporary cool condition due to opening doors and windows caused an immediate response in the previous thermostats to call for more heat. Ideal operation would call for heat only when actually required and not when short temporary cooling conditions seemed to indicate the need of heat. Thus a delayed action of the circuit closing member would be desirable until an actual condition existed where heat was needed.

It is an object of my invention to eliminate the necessity of carrying a current through the thermostat proper thus relieving it of inaccuracies and heavy duty which such a delicate apparatus was not intended for.

It is a further object of my invention to produce a thermostat in which delayed operation of the controlling circuit will insure proper operation of the heat control means to furnish heat only when there is an actual need for the same.

The preferred embodiment of my invention comprises a ratchet and pawl mechanism for rotating a cam shaft for opening and closing an electrical circuit in which is placed the heat control means. The pawl is oscillated by means of a continuously rotating induction disc or synchronous motor. The pawl consists of a link mechanism including two dogs, one on each side of the ratchet, for rotating the ratchet one only of said dogs being operative at a time.

A bimetal thermostat responsive to temperature conditions determines which of said dogs is to be operative. Each of the dogs rotates the cam shaft through 180°. The cams carried by the shaft open and close an electrical circuit to operate a motor which in turn opens and closes drafts or operates a blower or other like apparatus to control the heat supplying means in response to a thermostatic control.

The drawing illustrates a preferred embodiment of the invention in which Fig. 1 is a diagrammatic view of a mechanical relay and associated apparatus; Fig. 2 another heat control device which can be used with the relay.

In Fig. 1, 10 designates a conventional furnace with drafts 11 and 12. Motor 14 operates through a train of gearing to actuate member 15 to open and close drafts 11 and 12 with the assistance of a counterweight 13. 17 designates a cam of a limit switch and 18 the switch member actuated thereby to open and close the circuit through motor 14 to initiate and terminate the operation of the motor.

20 designates a low potential relay operating armature 19 to open and close the motor circuit. This relay is energized by means of transformer 21 connected to the lines $L_1$ and $L_2$ whenever contacts 39 of the mechanical relay are closed.

The synchronous motor 30 rotates a gear 32 upon which is mounted a pin 31 cooperating with the fork of lever 33 which actuates a link mechanism of which dogs 34 and 35 are a part. This link mechanism consisting of elements 33, 34 and 35 is pivoted at $33_1$. Pin 31 is off center and causes the link mechanism to oscillate about the pivot $33_1$ upon rotation of gear 32. Shaft 36 carries a ratchet $36_1$ as well as cams 37 and 38 which open and close the contacts 39. Ratchet $36_1$ has teeth on only half of its circumference.

Only one of said dogs 34 or 35 is operative at a time, the operative dog being determined by a thermostat described below.

A thermostat of the bimetal type is used to determine which of said dogs 34 or 35 is to operate. A beam 43 pivoted at $43_1$ and carrying a bimetal strip 44 is connected to the link mechanism mentioned above by element 45. The beam 43 carries screws 50 and 51 which cooperate with cams 46 and 47 to determine the temperature limits between which the thermostat operates. 48 and 49 are dials for setting the temperature limits. These dials are set for day and night temperatures. Element 41 pivoted at $41_1$ operates through spring 42 to determine the setting of the thermostat. Element 41 is urged against the cam $40_1$ by means of spring $41_2$. Cam $40_1$ is mounted on a gear which is driven from the synchronous motor 30 by means of a train of gears. The cam is rotated one revolution every 24 hours. Cam $40_1$ and element 41 operate to cause the beam 43 to be pivoted so that elements 50 or 51 are in contact with the cams 46 or 47, thus determining the day or night temperature limits. The operation of the device is as follows:

The link mechanism consisting of dogs 34, 35 and element 33 is continuously oscillated by means of the synchronous motor 30. As shown dog 34 is in contact with the ratchet $36_1$ to rotate the ratchet and shaft 36 upon which are mounted cams 37 and 38. When the ratchet is rotated so that dog 34 comes in contact with the smooth circumference of the ratchet, the lower spring member of the contact 39 will be permitted by cam 37 to drop thus opening contact 39. This deenergizes relay 20 permitting the armature to be moved to the left hand contact. This completes the circuit through the motor through the lower contact of switch element 18, thus causing the motor 14 to be actuated to open damper 11 and close damper 12 of the furnace 10. When the dampers have reached this position the limiting cam 17 causes the switch element 18 to be moved upward against the upper contact thus opening the motor circuit and stopping the rotation of the motor.

Since the dog 34 is in contact with the smooth surface of the ratchet $36_1$ no further rotation of the shaft 36 will take place. As the temperature decreases the bimetal strip 44 will be actuated to cause the dog 35 to move into contact with ratchet $36_1$ and the dog 34 out of contact with the ratchet $36_1$. The dog 35 will then engage with the teeth of the ratchet $36_1$ to rotate the shaft 36 through half a revolution. This will cause the contacts 39 to again close to complete the circuit through relay 20. The armature 19 will then be moved to the right hand contact, thus completing the motor circuit through the upper contact of the switch 18. This will cause draft 11 to close and draft 12 to open. The motor circuit is then opened by the limiting cam 17. Of course if due to position of the thermostat neither dog is in contact with the ratchet, no operation will result.

Due to the reduction gearing, the ratchet $36_1$ is not rotated instantaneously through a half revolution. This means that a sudden draft causing the thermostat to call for more heat, will rotate the ratchet only a few teeth without setting the entire apparatus in motion. When the draft has ceased, the thermostat will return to neutral or to its cold position, making the link mechanism inoperative so long as the temperature is right.

The position of the cam $40_1$ will determine upon which of the two cams 46 or 47 the beam 43 will rest. This, of course, will change the temperature limits between which the device will operate to control the drafts on the furnace 10.

The terminals of the relay may be connected to a motor circuit as shown in Fig. 2. Whenever the contact 39 is closed it will cause the blower 14' to operate to increase the draft to the furnace 10' thus increasing the heat delivered to the location of the thermostat.

From the above description it will be seen that I have invented a thermostatically controlled mechanical relay, which relieves the thermal responsive element of practically all the work required to operate the switch contacts and also insures a time delay in heating control service so as to avoid operation responsive to temporary variations in temperature.

What I claim as new and desire to secure by Letters Patent of the United States, is:

1. In a heat control device, a circuit controlling device having a member movable through a cycle to open and close a circuit, continuously oscillated means adapted to intermittently act upon said member to move said member through its cycle, and heat responsive means connected to said oscillated means to control the intermittent operation.

2. In a heat controlling device, regulating means for increasing and decreasing the heating action, a thermal responsive element movable to one position to effect operation of the regulating means to increase the heating action and to another position to effect operation of the regulating means to decrease the heating action, and electric motor operated timing means cooperating with the thermal element to delay operation of the regulating means to decrease the heating action for an interval after operation of the thermal element to said other position.

3. In a heat control device, a circuit controlling member movable through a cycle to open and close a circuit, a continuously oscillated means for intermittently actuating said member, and heat responsive means operatively connected to said oscillated means for determining the operation of said circuit controlling member.

4. In a heat control device, a thermal responsive element, a switch means for opening and closing a circuit rendered operative by means of the thermal responsive element to close said circuit, and electric motor operated means for delaying the opening of said switch for a time interval after operation of the thermal element to render said switch operative to open said circuit.

5. In a control device, a circuit controlling member including a cam shaft movable through a cycle to a plurality of positions, a continuously oscillated mechanism selectively operated and cooperating with said cam shaft to move said member to any one of said positions, and a heat responsive device for controlling the operation of said mechanism.

6. In a control device, a circuit controlling means including a cam shaft movable through a cycle to a plurality of positions, a mechanism cooperating with said cam shaft for intermittently operating said means, means actuating said mechanism, and a heat responsive device connected to said mechanism to determine operation of said circuit controlling means to one of its positions.

7. In a relay, a circuit controlling means, a link mechanism for operating said means through a cycle, a continuously rotated member, connections between said member and said link mechanism for oscillating the same to operate said controlling means, and a heat responsive device connected to said link mechanism to determine operation of said controlling means.

8. In a relay, a circuit control means, a ratchet and pawl mechanism for intermittently operating said means through a cycle, said pawl being continuously oscillated and a heat responsive device connected to said mechanism for controlling said intermittent operation.

9. In a mechanical relay a circuit controlling cam shaft, a ratchet carried thereby, a continuously oscillated pawl mechanism for intermittently driving said ratchet, and a heat responsive device connected to said pawl mechanism for determining said intermittent operation.

10. In a mechanical relay for controlling an electric circuit comprising a ratchet with teeth on only part of its circumference, oppositely disposed dogs continuously operated for rotating said ratchet, one only of said dogs operative at a time and means connected to said dogs for selecting the operative dog.

11. In a mechanical relay for controlling an electric circuit, comprising a ratchet with teeth on only part of its circumference, oppositely disposed dogs each operative to rotate said ratchet only half a revolution, one only of said dogs operative at a time, and means connected to said dogs for rendering said dogs operative.

12. In a mechanical relay, a circuit controlling cam shaft movable to a plurality of positions, a ratchet thereon, a pivotally mounted pawl provided with oppositely disposed dogs for rotating said pawl and shaft to any one of said positions, only one of said dogs being operative at a time, continuously rotated gearing, connections between said gearing and said pawl for oscillating the same to drive the ratchet, and an adjustable heat responsive device automatically set for day and night operation connected to and selectively controlling the operation of said dogs.

13. In a heat control device, a circuit controlling device movable through a cycle to open and close a circuit, a continuously actuated means for actuating said device and an adjustable heat responsive means for determining the operation of said circuit controlling device, said heat responsive means comprising a centrally pivoted member supporting a heat responsive element, adjusting means mounted at either end of said pivoted member, cams for cooperating with said adjusting means to determine the operating temperatures of said heat responsive means and a second pivoted member actuated by said continuously actuated means for pivoting said first pivoted member to bring one or the other of said adjusting means in contact with one of said cams.

14. In a heat control device, a heat control means, an electric motor for operating said heat control means, and a mechanical relay comprising a circuit controlling member connected to said motor and movable to a plurality of positions to operate said motor, and a heat responsive means for selectively operating said circuit control member to any one of said positions, said relay having means for delaying operation of said circuit controlling means by said heat responsive means.

15. In a heat control device, a heat control means, an electro-responsive device for operating said heat control means, and a mechanical relay controlling said electro-responsive device, link mechanism for intermittently operating said last means, means actuating said link mechanism and a heat responsive device connected to said link mechanism to determine operation of said electro-responsive control means.

In witness whereof, I have hereunto set my hand this 26 day of Nov. 1929.

CHESTER I. HALL.